June 29, 1948.                C. A. ALDRICH                2,444,276
SHEAR-RESISTING JOINT ELEMENT
Filed July 24, 1943
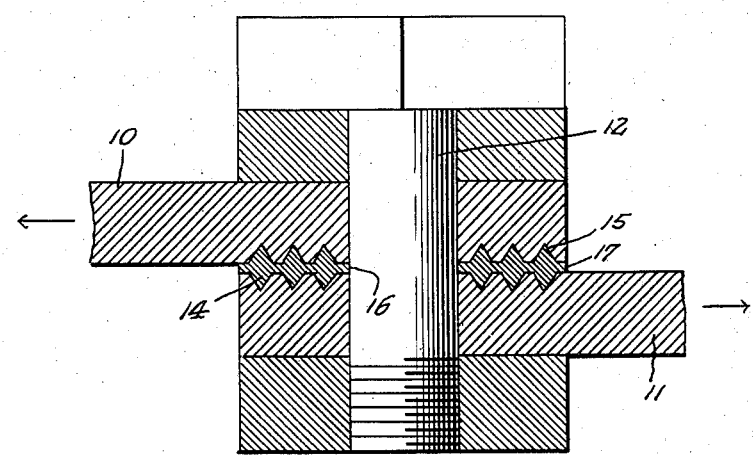
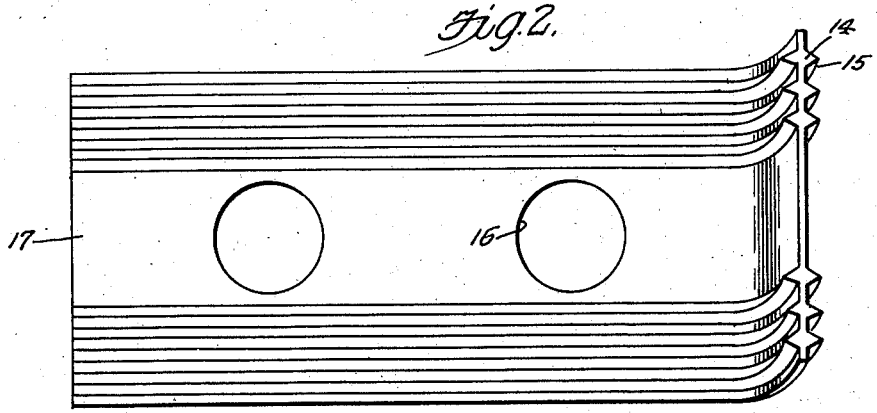
Inventor
C. A. Aldrich.
By A. D. Adams
Attorney Patented June 29, 1948

2,444,276

UNITED STATES PATENT OFFICE 2,444,276

SHEAR-RESISTING JOINT ELEMENT

Clare Aaron Aldrich, Philadelphia, Pa.

Application July 24, 1943, Serial No. 496,087

3 Claims. (Cl. 189—36)

This invention relates to shear-resisting joints between structural elements and sheets and, among other objects, aims to provide a greatly improved, simple, compact and highly efficient shear-connection between two riveted or bolted members of such nature that a high degree of workmanship is not required. Another aim is to provide improved shear-resisting means adapted to be arranged between joined structural members to resist shear under tension or compression and to reduce the number of bolts or rivets to a minimum.

Other aims and advantages of the invention will appear in the specification, when considered in connection with the accompanying drawings, wherein:

Fig. 1 is a sectional view, on enlarged scale, of a joint between structural members, embodying one form of my shear-resisting element; and Fig. 2 is a face view, on enlarged scale, showing the shear-resisting element in Fig. 1.

Referring more particularly to the drawings, the shear-resisting elements there shown are designed primarily to increase the resistance to shear at the bolted or riveted connections between two adjacent structural elements fastened together by bolts or rivets. To obtain a rigid shear connection which is capable of only a small lateral displacement, when subjected to a load, it is customary in structural and aircraft work, to ream out the registering holes to produce a snug fit and perfect alinement for the final assembly. When the joined elements are subjected to stresses, the transfer of shearing stresses takes place between one member and the other through the bolt and along the bolt from the center of the bearing on one member to the center of the bearing on the other member. Such joined members usually fail under tension along the center line of the bolt, because the members have less material at the center line of the bolt and practically no transfer of stress takes place at the sides of the bolt. The joint may also fail due to the actual stresses exceeding the permissive bearing loads, especially in the case of thin members.

Referring to Fig. 1, there is shown a joint between two structural members which may be in the form of strap metal or sheet elements 10 and 11. They are secured together by an ordinary bolt 12 having a washer between its head and the top sheet. However, it is to be understood that the bolt is merely representative of one form of fastening means and that the joint may be made by ordinary rivets. In this instance, the shear-resisting element is shown as being in the form of a hardened metal strip 14 having opposed ridges 15 formed on opposite sides of the bolt holes 16, as shown in Fig. 2. It is preferably made of ribbon or strip steel and hardened after the ridges are formed and the width is preferably substantially equal to the maximum dimension of the bolt head or the nut, so that when the bolt is tightened, the ridges will swage the softer metal or material of the joint members 10 and 11 and resist shearing displacement in either direction, as indicated by the two arrows in Fig. 1. In this instance, the thickness of the strip is such that it can easily be made like an ordinary band-saw blade and the central portion or web 17 is so thin that the bolt hole 16 may be punched or broken out by the bolts or rivets or by an ordinary punch. Furthermore, the strip may be of any length and rolled up for shipment, as indicated by the bent right hand end in Fig. 2 and it may be cut or broken off at any point, depending upon the extent of the joint to be made, or it may be broken off to provide individual, rectangular, shear-resisting elements.

From the foregoing description, it will be seen that the shear-resisting elements are very simple in their design and construction and are adapted to reduce to a minimum the number of bolts or rivets used in making structural joints. They will increase the resistance of ordinary bolted joints by as much as 60% over the resistance of ordinary joints. Moreover, the number of bolts or rivets required in assembling sheets for aircraft construction and the like will be very greatly reduced. The elements are easily applied between the structural members and cannot be displaced due to ordinary stresses. Furthermore, shear-resisting members of the type shown in Figs. 1 and 2 may be employed to make water or fluid-tight joints where such joints are subjected to shearing stresses.

Obviously, the present invention is not restricted to the particular embodiments thereof herein shown and described.

What is claimed is:

1. A shear-resisting element comprising a flexible, hardened, elongated metal strip having a flat thin central portion adapted to have openings punched through it to receive fastening members, and a plurality of integral, parallel, longitudinally positioned swaging ridges on both faces of the strip and on opposite sides of said thin portion, said ridges being directly opposite each other on the two faces of the strip.

2. As an article of manufacture, a shear-resisting member comprising an elongated, flexible strip of hardened metal having a flat thin central portion adapted to have openings punched through it to receive fastening members, and a plurality of integral, parallel, longitudinally positioned angular swaging ridges on both faces of the strip and on opposite sides of said thin portion, said ridges being correspondingly spaced on said opposite faces and the peaks of the corresponding spaced ridges being directly opposite to each other, said strip being adapted to be flexed and rolled up and being sufficiently hard to permit it to be broken into washer-like pieces of the desired length.

3. A shear-resisting member as set forth in claim 2, wherein the thin portion of the strip is provided with a row of openings to receive fastening elements.

CLARE A. ALDRICH.

REFERENCES CITED

The following references are of record in the file of this patent:

UNITED STATES PATENTS

| Number | Name | Date |
| --- | --- | --- |
| 658,598 | Stevens | Sept. 25, 1900 |
| 845,639 | Herriman | Feb. 26, 1907 |
| 931,164 | Vining | Aug. 17, 1909 |
| 1,278,085 | Allmand | Sept. 10, 1918 |
| 1,289,147 | Forssell | Dec. 31, 1918 |
| 1,634,561 | Shapiro | July 5, 1927 |
| 1,871,521 | Hodell | Aug. 16, 1932 |
| 2,126,002 | Gardner | Aug. 9, 1938 |

FOREIGN PATENTS

| Number | Country | Date |
| --- | --- | --- |
| 56,554 | Sweden | Aug. 2, 1920 |
| 59,718 | Sweden | Apr. 24, 1924 |
| 128,561 | Great Britain | 1919 |
| 588,464 | France | Jan. 31, 1925 |
| 696,774 | France | Oct. 20, 1930 |